(12) United States Patent
Dong

(10) Patent No.: US 12,581,558 B2
(45) Date of Patent: Mar. 17, 2026

(54) MULTI-LINK COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 410 days.

(21) Appl. No.: 18/002,754

(22) PCT Filed: Jul. 28, 2020

(86) PCT No.: PCT/CN2020/105273
§ 371 (c)(1),
(2) Date: Dec. 21, 2022

(87) PCT Pub. No.: WO2022/021086
PCT Pub. Date: Feb. 3, 2022

(65) Prior Publication Data
US 2023/0247699 A1     Aug. 3, 2023

(51) Int. Cl.
*H04W 76/15* (2018.01)
*H04W 76/11* (2018.01)

(52) U.S. Cl.
CPC ............ *H04W 76/15* (2018.02); *H04W 76/11* (2018.02)

(58) Field of Classification Search
None
See application file for complete search history.

(56) References Cited

U.S. PATENT DOCUMENTS

| | | | | |
|---|---|---|---|---|
| 2023/0011167 A1* | 1/2023 | Chitrakar | .......... | H04W 74/0816 |
| 2023/0107072 A1* | 4/2023 | Kim | ....................... | H04W 28/02 |
| | | | | 370/230 |
| 2023/0284144 A1* | 9/2023 | Kim | ................. | H04W 52/0235 |
| | | | | 370/338 |

FOREIGN PATENT DOCUMENTS

| | | |
|---|---|---|
| CN | 106506125 A | 3/2017 |
| CN | 111066271 A | 4/2020 |
| ES | 2774741 T3 | 7/2020 |

OTHER PUBLICATIONS

International Search Report and Written Opinion of International Application No. PCT/CN2020/105273, mailed Apr. 26, 2021, 12 pages.
European Patent Office, Extended European Search Report issued in Application No. 20947041.8, dated Jul. 10, 2023, 8 pages.
Chitrakar, R., et al., "Multi-link acknowledgment", doc.: IEEE 802.11-19/1512R5, Sep. 10, 2019, 14 pages.
Notice of the first review opinion of the China National Intellectual Property Administration for Application No. 202080001444.0, dated Apr. 12, 2023, 15 pages.
Examination report for India Application No. 202247076837, issued on Sep. 5, 2023, 6 pages.

* cited by examiner

*Primary Examiner* — Kouroush Mohebbi
(74) *Attorney, Agent, or Firm* — Finnegan, Henderson, Farabow, Garrett & Dunner, L.L.P.

(57) ABSTRACT

A method for communication on multiple links, includes: determining a first message frame; and sending the first message frame, wherein the first message frame includes parameter information of the communication on the multiple links.

13 Claims, 4 Drawing Sheets

(a) Setup multiple times (b) Data & Block Ack (c) Teardown (Originator)     (Recipient)

electronic device 600 processor 610 memory 620

FIG. 6

MULTI-LINK COMMUNICATION METHOD AND COMMUNICATION DEVICE

CROSS-REFERENCE TO RELATED APPLICATION

This application is a national phase of International Application No. PCT/CN2020/105273, filed on Jul. 28, 2020, the entire content of which is incorporated herein by reference.

FIELD

The disclosure relates to the field of communication, and more particularly, to a communication method and a communication device on multiple links.

BACKGROUND

In the IEEE802.11be standard, a station (STA) and an access point (AP) can be a multi-link device (MLD), respectively, that is, the function of supporting simultaneous transmission and/or reception on multiple links at the same moment. Therefore, in the IEEE802.11be standard, there may be multiple links between the STA and the AP.

SUMMARY

A communication method on multiple links is provided. The method includes: determining a first message frame; and sending the first message frame, in which the first message frame includes parameter information of a multi-link communication.

A communication method on multiple links is provided. The method includes: receiving a first message frame, in which the first message frame includes parameter information of a multi-link communication; and determining a response message frame based on the first message frame.

An electronic device is provided. The electronic device includes: a processor, and a memory storing a computer program executable by the processor. The processor is configured to perform the above-mentioned method when executing the computer program.

A computer-readable storage medium is provided. The computer-readable storage medium has stored therein computer programs that, when executed by a processor, cause the above-mentioned method to be performed.

BRIEF DESCRIPTION OF THE DRAWINGS

The above and other features of embodiments of the disclosure will be more apparent by describing the embodiments of the disclosure in detail with reference to the accompanying drawings.

FIG. 6 is a schematic diagram showing an electronic device on multiple links according to some embodiments of the disclosure.

DETAILED DESCRIPTION

Figure 1:
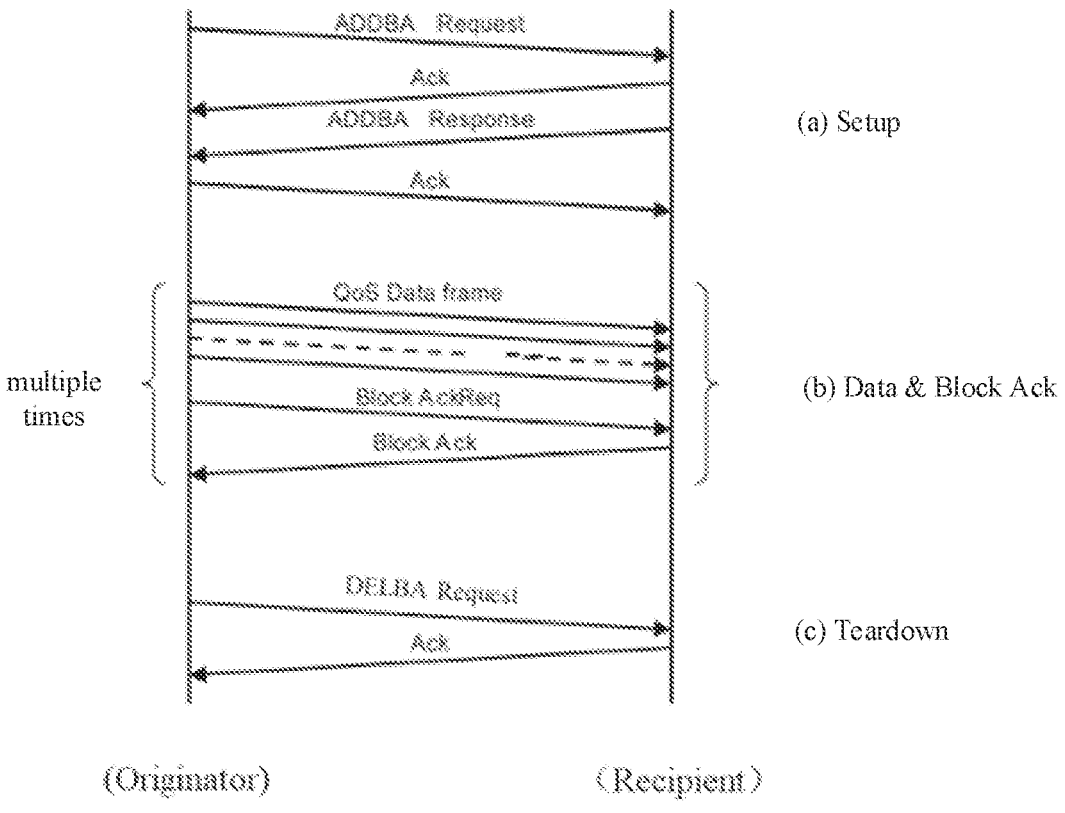
FIG. 1 is a schematic diagram showing an example of transmitting data frame(s).

The following description with reference to the accompanying drawings is provided to facilitate a comprehensive understanding of various embodiments of the disclosure defined by the appended claims and their equivalents. The various embodiments of the disclosure include various details, but these details are only illustrative. In addition, the description of well-known technologies, functions, and constructions may be omitted for clarity and conciseness.

For those skilled in the art, the description of various embodiments of the disclosure is provided only for the purpose of illustration, but not for the purpose of limitation.

It should be understood that "a", "an", "said", and "the" in singular forms used herein can also include plural forms, unless clearly indicated in the context otherwise. It should be further understood that the word "include" used in the disclosure refers to the existence of described features, integers, steps, operations, elements, and/or assemblies, but does not exclude the existence or addition of one or more other features, integers, steps, operations, elements, assemblies, and/or groups thereof.

It will be understood that although the terms "first" and "second" and the like can be used herein to describe various elements, these elements should not be limited by these terms. These terms are only used to distinguish one element from another. Therefore, a first element discussed below may be referred to as a second element without departing from the teaching of the embodiments.

It should be understood that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . ." used herein includes any and all combinations of one or more related listed items.

In the IEEE802.11be standard, there may be the following situations: the receive status of quality of service (QoS) data frames of a traffic identifier (TID) received on a link shall be signaled on the same link and may be signaled on other available link(s). Sequence numbers are assigned from a common sequence number space shared across multiple links of a MLD, for a TID that may be transmitted to a peer MLD over one or more links.

According to the above situations, QoS data frames provided with the same TID can be transmitted on one or more links, and their receive status can also be signaled on one or more links. In addition, the QoS data frames may include a single data frame or continuous data frames.

In the existing standard, in order to increase a utilization rate of a spectrum, the transmission of continuous data frames is generally adopted when transmitting data frames, and then a block Ack (BA) is returned. The mechanism is shown in FIG. 1.

In 802.11be, there may be the following situations: QoS data frames of one TID (or multiple TIDs) can be transmitted on multiple links, and their receive status can be signaled on the same link or other link(s). However, the existing BA negotiation mechanism is only applied to communication on a single link, so it needs to be enhanced.

The embodiments of the disclosure will be described in detail below with reference to the accompanying drawings.

FIG. 1 is a schematic diagram showing an example of transmitting data frame(s). The data frame(s) may be transmitted in a link form shown in FIG. 1.

Referring to FIG. 1, in (a) a setup phase, an originator and a recipient initiate a session by a handshake between an add block Ack (ADDBA) request frame and an ADDBA response frame. Both the ADDBA request frame and the ADDBA response frame may be management frames and may exist in a form of action frames. The management frames (the ADDBA request frame and the ADDBA response frame) need to be acknowledged by an Ack (acknowledgment). As shown in FIG. 1, a process of establishing the session as follows. The originator sends the ADDBA request frame to the recipient. The recipient returns an Ack for indicating that the ADDBA request frame has been received, and then the recipient sends the ADDBA response frame for the ADDBA request frame. The originator returns an Ack for indicating that the ADDBA response frame has been received.

After the session is established, in (b) a data & block Ack phase, for example, during a transmission opportunity (TXOP), the originator can continuously send multiple data frames, for example, quality of service (QoS) data frame (that is, the QoS data frame in FIG. 1). The block Ack request frame is sent after the data frame transmission ends. The recipient feeds back the block Ack for multiple data frames.

After the block Ack is completed, the session can be closed. In detail, in (c) a teardown phase, the originator may send a DELBA request frame, and then the recipient returns an Ack.

In (a) the setup phase, a format of the ADDBA request frame sent by the originator to the recipient can be shown in Table 1 below.

TABLE 1

| Action field format of ADDBA request frame | |
| --- | --- |
| Order | Information |
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address element (optional) |
| 8 | Multi-band (optional) |
| 9 | TCLAS (optional) |
| 10 | ADDBA Extension (optional) |

Referring to Table 1, the ADDBA request frame as the action frame may include: a category field, a block Ack action field, a dialog token field, a block Ack parameter set field, and a block Ack timeout value field. In addition, optionally, the ADDBA request frame may further include: a groupcast with retries (GCR) group address element field, a multi-band field, a traffic classification (TCLAS) field, and an ADDBA extension field.

The definition of the block Ack parameter set field in the fourth information field of Table 1 may be shown in Table 2 below.

TABLE 2

| fixed field of block Ack parameter set | | | |
| --- | --- | --- | --- |
| B0 | B1 | B2 B5 | B6 B15 |
| A-MSDU Supported | Block Ack Policy | TID | Buffer Size |
| bits: 1 | 1 | 4 | 10 |

In Table 2, the MSDU may indicate a MAC service data unit. The BA policy can be used to define whether the Ack is immediate feedback or delayed feedback. The TID may indicate a traffic identifier. The buffer size can indicate a number of buffers available for a particular TID. For example, a number of octets that each buffer can hold is equal to a maximum value of the MSDU when the A-MSDU supported field indicated by the block Ack parameter set field sent by the STA is equal to 0. The number of octets that each buffer can hold is equal to a maximum A-MSDU supported by the STA when the A-MSDU supported field indicated by the STA is equal to 1.

The definition of the block Ack timeout value field in the fifth information field of Table 1 is shown in Table 3 below.

TABLE 3

| fixed field of block Ack timeout value | |
| --- | --- |
| | Block Ack Timeout Value |
| Octets: | 9 |

As mentioned above, the existing BA negotiation mechanism is only applied to a single link. For example, as shown in Table 2, only the block Ack parameter set in the case of the single link is defined, which may not be applied to the MLD. Therefore, the BA negotiation mechanism needs to be enhanced.

Figure 2:
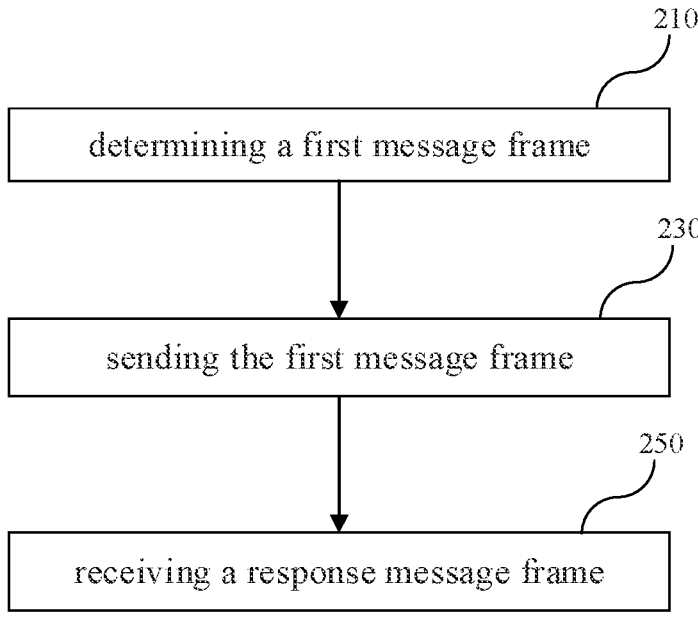
FIG. 2 is a flow chart showing a communication method on multiple links according to some embodiments of the disclosure.

FIG. 2 is a flow chart showing a communication method on multiple links according to some embodiments of the disclosure.

The flow chart of FIG. 2 may be an operation performed by the originator, and correspondingly, an operation performed by the recipient may be shown in FIG. 3, which will be described below. According to some embodiments of the disclosure, the originator and the recipient may be communication apparatuses supporting the multiple links. For example, the originator may be a STA, and correspondingly, the recipient may be an AP. Alternatively, the originator may be the AP, and correspondingly, the recipient may be the STA. The AP may include a software application and/or a circuit so that other types of nodes in the wireless network can communicate with the outside and inside of the wireless network through the AP. In some examples, as an example, the AP may be a terminal device or a network device equipped with a wireless fidelity (Wi-Fi) chip. As an example, the STA may include, but is not limited to, a cellular phone, a smart phone, a wearable device, a computer, a personal digital assistant (PDA), a personal communication system (PCS), a personal information manager (PIM), a personal navigation device (PND), a global positioning system, a multimedia device, an Internet of Things (IoT) device, etc. In addition, in some embodiments of the disclosure, both the AP and the STA may be the MLDs. However, the above description is only illustrative, and some embodiments of the disclosure are not limited thereto.

Referring to FIG. 2, in step 210, a first message frame may be determined. According to some embodiments of the disclosure, the first message frame may be the ADDBA request frame to be sent by the originator. However, some embodiments of the disclosure are not limited thereto, and the first message frame may be any other type of frame according to a communication environment. In some embodiments, the first message frame may be determined according to a communication capability of the originator, a current communication environment, and the like. In other embodiments, a pre-stored or pre-written first message frame may be directly obtained, and the step 210 of determining the first message frame is omitted.

According to some embodiments of the disclosure, the first message frame may include a first type identifier. The first type identifier may be configured to indicate a type of the first message frame on the multiple links. That is, the first message frame can be defined as a new type of action frame by using the first type identifier. For example, the first type identifier may indicate that the first message frame is a new ADDBA request frame suitable for an advanced communication standard (e.g., the IEEE 802.11be standard). According to some embodiments of the disclosure, the first type identifier may be the second information field (block Ack action) in Table 1, and its specific format may be shown in Table 4 below.

TABLE 4

| fixed field format of block Ack action | |
| --- | --- |
| Block Ack Action field values | meaning |
| 0 | ADDBA Request |
| 1 | ADDBA Response |
| 2 | DELBA |
| 3-255 | Reserved |

In the first message frame, any of the reserved values 3-255 can be selected as a value of the block Ack action (i.e., as a value of the first type identifier) to indicate the first type of the first message frame according to some embodiments of the disclosure. For example, the first type identifier (e.g., the block Ack action) may be set to any value (e.g., 3) other than 0 to 2 when determining the first message frame, thus indicating that the first message frame may be a new request frame supporting the advanced communication standard (e.g., the IEEE802.11be standard). That is, the first message frame is the ADDBA request frame on the multiple links. The recipient can determine the type of the first message frame according to the first type identifier when receiving the first message frame, and determine whether the first message frame can be further parsed. For example, when the recipient that does not support the advanced communication standard (for example, the IEEE802.11be standard) determines that the received first message frame is a new request frame according to the first type identifier, such that the recipient may give up further parsing of the first message frame. In addition, the first type identifier may also be set to a value of 0 to 2, thus indicating that the first message frame is an ADDBA request frame in the existing standard (e.g., the IEEE802.11ax standard). That is, some embodiments according to the disclosure may be compatible with the existing standard.

According to some embodiments of the disclosure, the first message frame may further include parameter information of a multi-link communication. According to some embodiments of the disclosure, the parameter information included in the first message frame may include at least one buffer size parameter, at least one link set identifier, at least one TID, etc. For example, the parameter information of the multi-link communication can be shown in Table 5 below.

TABLE 5

| Parameter information format of first message frame | | | | | | |
| --- | --- | --- | --- | --- | --- | --- |
| A-MSDU Supported | Block Ack Policy | TID | Buffer size | Buffer size | . . . | Link set |

Meanings of "A-MSDU Supported" and "Block Ack Policy" in Table 5 are similar to the existing standard, and its descriptions are omitted herein for conciseness.

According to some embodiments of the disclosure, the buffer size parameter included in the parameter information may correspond to the buffer size in Table 5. The link set identifier included in the parameter information may correspond to the link set in Table 5. The TID included in the parameter information may correspond to the TID in Table 5.

The TID may represent the TID of the QoS data frame(s) to be transmitted (e.g., the QoS data frame(s) to be transmitted in phase (b) of FIG. 1).

According to some embodiments of the disclosure, although QoS data frames with the same TID may be transmitted on the multiple links, during data transmission, the QoS data frames may not be transmitted on all of the multiple links. That is, although the STA or the AP can activate the multiple links, the specific transmission of the QoS data frames may not be performed on all the activated links, and may be performed on one or more of the activated links. The receive status of the QoS data frames fed back from the recipient may be signaled on one or more links.

According to some embodiments of the disclosure, the link set identifier (e.g., the link set) may be set in the parameter information to indicate the link(s) for transmitting data frames with the same TID. That is, the link set corresponding to the link set identifier has at least one link to be used for data transmission among the multiple links. In other words, a value of the link set identifier is related to a number of links to be used for data transmission among the multiple links. For example, when the link set is set to "11000000", it identifies that only two links will be used for data transmission. However, this is only illustrative, and embodiments of the disclosure are not limited thereto.

According to some embodiments of the disclosure, a number of buffer size parameters is related to a number of links in the link set. In other words, the number of buffer size parameters included in the parameter information is related to the value of the link set identifier. For example, when the link set is set to "11000000", that is, it identifies that only two links will be used for data transmission, the number of times that the buffer size parameter appears in the parameter information (that is, the number of buffer size parameters) may correspond to 2. That is, there may be two buffer sizes in Table 5, and the two buffer sizes correspond to the two links to be used for data transmission, respectively.

In addition, the buffer size can be different or the same on each link. In some embodiments, for the MLD that supports simultaneous transmission and reception, there will be no interference between uplink and downlink data transmission among links when data are transmitted on the multiple links. Therefore, the buffer size on each link may be different. In other embodiments, for the MLD that supports simultaneous transmission or reception, that is, such the MLD only supports transmission or reception at the same time, there may be interference between uplink and downlink data transmission among links when data are transmitted on the multiple links. Therefore, the buffer size on each link needs to be the same. However, this is only an example, and the disclosure concept is not limited thereto. For example, for the MLD that supports simultaneous transmission or reception, the buffer size on each link can be different when the data frames transmitted by the originator on each link arrive at the recipient at the same time (that is, corresponding data frames transmitted on each link arrive at the recipient at the same time).

In addition, according to some embodiments of the disclosure, the link set identifier may also be omitted. That is, the first message frame may not include the link set identifier. In this case, the position of each buffer size in the parameter information implicitly corresponds to the link set identifier. For example, referring to Table 5, the link set may not be included, and the position of the buffer size also implicitly corresponds to the link set identifier.

In addition, considering that there is a Multi-TID BA in wireless communication, according to some embodiments of the disclosure, the BA mechanism of the QoS data frames corresponding to the Multi-TID can be negotiated in the ADDBA request frame. As shown in Table 6 below.

TABLE 6

| Parameter information format of first message frame | | | | | | | | | | | |
|---|---|---|---|---|---|---|---|---|---|---|---|
| A-MSDU Supported | Block Ack Policy | TID 1 | Buffer size | Buffer size | ... | Link set 1 | TID 2 | Buffer size | ... | Link set 2 | ... |

In Table 6, links used to transmit the QoS data frames of TID 1 can be identified by using link set 1, and as described with reference to Table 5, the number of times of the buffer size with TID 1 is related to the number of links in link set 1. Similarly, links used to transmit the QoS data frames of TID 2 can be identified by using link set 2, and the number of times of buffer size with TID 2 is related to the number of links in link set 2. In addition, links to be used for data transmission in each link set may be the same or different, that is, a value of each link set may be the same or different.

In addition, in the case of multi-TID BA, the link set identifier can also be omitted. That is, the first message frame may not include the link set identifier. In this case, the position of the buffer size with each TID in the parameter information implicitly corresponds to the link set identifier. For example, referring to Table 6, link set 1 and link set 2, etc. may not be included, and the position of buffer size with TID 1 implicitly corresponds to a value of the link set identifier of link set 1, and the position of buffer size with TID 2 implicitly corresponds to a value of the link set identifier of link set 2.

According to the parameter information in Table 5 and Table 6, in a data transmission phase (e.g., the phase (b) shown in FIG. 1), the originator can receive the receive status of the QoS data frames on each link fed back from the recipient. For example, the receive status of the QoS data frames may be reflected in the corresponding feedback message frame (e.g., BA) received on each link, or the receive status of the QoS data frames may be reflected in the feedback message frame received on one link for all links.

In addition, according to some embodiments of the disclosure, the TID may also be omitted. That is, the first message frame may not include the TID. In this case, the buffer size parameter and the position of the link set identifier in the parameter information implicitly correspond to the TID. For example, referring to Table 5 and Table 6, the TID may not be included, and the position of the buffer size of each group and the link set also implicitly correspond to the link set identifier.

According to some embodiments of the disclosure, the first message frame may further include: time information on the multiple links. For example, a meaning of the time information included in the first message frame may be the same as a meaning of the block Ack timeout value in Table 3. However, in some embodiments of the disclosure, time information (Block Ack Timeout Value) may be set on each link. In some embodiments, the time information (Block Ack Timeout Value) on each link may be set to be the same. In this case, the time information (Block Ack Timeout Value) may be in the same format as Table 3. However, the embodiments of the disclosure are not limited thereto. For example, the time information (Block Ack Timeout Value) on each link may be set to be different. In this case, the time information (Block Ack Timeout Value) may include multiple block Ack timeout values and/or link set identifier corresponding to each link.

Continuing to refer to FIG. 2, in step 230, the first message frame determined in step 210 may be sent by the originator to the recipient. In step 250, the originator may receive a response message frame from the recipient regarding the first message frame sent in step 230. According to some embodiments of the disclosure, the received response message frame includes information corresponding to the parameter information described with reference to step 210. A detailed description will be made later with reference to FIG. 3.

Figure 3:
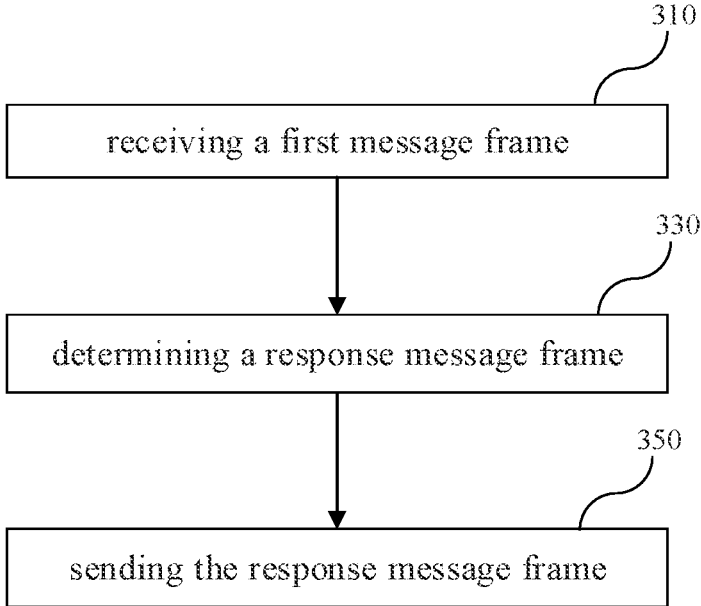
FIG. 3 is a flow chart showing a communication method on multiple links according to other embodiments of the disclosure.

FIG. 3 is a flow chart showing a communication method on multiple links according to other embodiments of the disclosure.

Referring to FIG. 3, in step 310, a first message frame may be received, in which the first message frame includes parameter information of a multi-link communication. The parameter information included in the first message frame may include at least one buffer size parameter, at least one link set identifier, at least one traffic identifier, and the like. The link set corresponding to the link set identifier has at least one link to be used for data transmission among the multiple links. A number of buffer size parameters is related to a number of links in the link set, and the TID corresponds to the link set identifier. The first message frame and the parameter information herein are similar to those described above with reference to step 210 in FIG. 2, and the repeated description is omitted for conciseness.

In step 330, a response message frame may be determined based on the first message frame received in step 310.

In some embodiments, the determined response message frame may be similar to the format of the first message frame. For example, as an example, the format of the determined response message frame may be shown in Table 7 below.

TABLE 7

| Order | Information |
|-------|-------------|
| action field format of ADDBA response frame | |
| 1 | Category |
| 2 | Block Ack Action |
| 3 | Dialog Token |
| 4 | Status Code |
| 5 | Block Ack Parameter Set |
| 6 | Block Ack Timeout Value |

Referring to Table 7, the status code may represent a status code. The status code, the category, and the dialog token are similar to existing standards, and detailed descriptions thereof are omitted for conciseness. It will be understood that the response message frame shown in Table 7 may be an example of the format of the ADDBA response frame, which is not limited to that shown in Table 7. For example, the ADDBA response frame may also include the GCR Group Address Element field, the Multi-band field, the TCLAS field, and the ADDBA Extension field, etc.

According to some embodiments of the disclosure, the response message frame may include a second type identifier. The second type identifier is configured to indicate a type of the response message frame on the multiple links. For example, the second type identifier may be the block Ack action field in Table 7. In some embodiments, the block Ack action field may be defined according to Table 4 above. In the response message frame, any value in the reserved values 3-255, that is different from the first type identifier, can be selected as a value of the block Ack action (i.e., as a value of the second type identifier) to indicate the type of the response message frame according to some embodiments of the disclosure. For example, the second type identifier (e.g., the block Ack action) may be set to any value (e.g., 4) other than 0 to 2 and the first type identifier when determining the response message frame, thus indicating that the response message frame may be a new response frame supporting the advanced communication standard (e.g., the IEEE802.11be standard), that is, the response message frame is the ADDBA response frame on the multiple links.

In some embodiments, in detail, the parameter information in the response message frame may be determined based on the parameter information included in the first message frame received in step 310.

For example, when the recipient receives the first message frame, if the recipient agrees with the parameter information included in the first message frame sent by the originator, the recipient keeps the same value of each parameter in the response message frame. For example, in the example of Table 7, same information as the parameter information (e.g., Table 5 and Table 6) of the first message frame may be set in the block Ack parameter set. However, this is only an example. For example, the parameter information in the response message frame (e.g., the block Ack parameter set in the example of Table 7) may only include a single bit value to indicate agreement with the parameter information of the first message frame when the recipient agrees with the parameter information of the first message frame sent by the originator.

For example, when the recipient receives the first message frame, if the recipient does not agree with the parameter information included in the first message frame sent by the originator, the recipient can set a value of parameter information corresponding to the disagreed parameter information in the response message frame. For example, different buffer sizes and link sets can be set in the block Ack parameter set of the response message frame.

With continued reference to FIG. 3, in step 350, the response message frame may be sent.

The above-mentioned communication methods provided by the embodiments of the disclosure can enable the QoS data frames provided with the same TID to be transmitted and the receiving status is signaled, on the multiple links, thus improving the network throughput.

Figure 4:
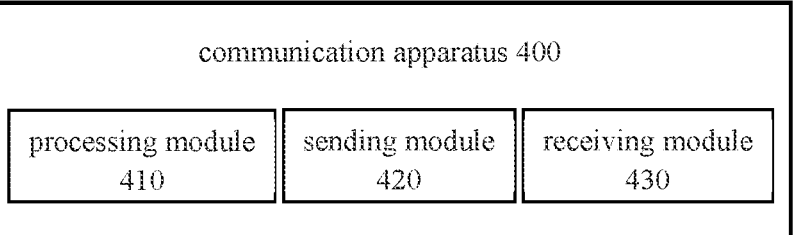
FIG. 4 is a schematic diagram showing a communication apparatus on multiple links according to some embodiments of the disclosure.

FIG. 4 is a schematic diagram showing a communication apparatus on multiple links according to some embodiments of the disclosure.

Referring to FIG. 4, the communication apparatus 400 may include a processing module 410, a sending module 420, and a receiving module 430.

The processing module 410 may be configured to determine a first message frame. The first message frame includes parameter information of a multi-link communication. The first message frame may be similar to the format described with reference to FIG. 2, and the repeated description is omitted for conciseness.

The sending module 420 may be configured to send the first message frame. The receiving module 430 may be configured to receive a response message frame with respect to the first message frame, in which the response message frame includes information corresponding to the parameter information. The response message frame may be similar to the format described with reference to FIG. 3, and the repeated description is omitted for conciseness.

Figure 5:
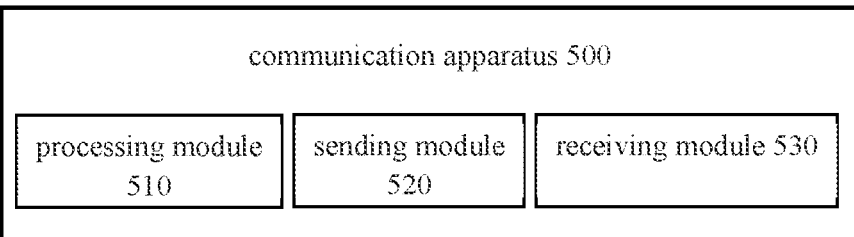
FIG. 5 is a schematic diagram showing a communication apparatus on multiple links according to other embodiments of the disclosure.

FIG. 5 is a schematic diagram showing a communication apparatus on multiple links according to other embodiments of the disclosure.

Referring to FIG. 5, the communication apparatus 500 may include a processing module 510, a sending module 520, and a receiving module 530.

The receiving module 530 may be configured to receive a first message frame, in which the first message frame includes parameter information of a multi-link communication. The first message frame may be similar to the format described with reference to FIG. 2, and the repeated description is omitted for conciseness.

The processing module 510 may be configured to determine a response message frame based on the first message frame. In detail, the processing module 510 may be configured to determine parameter information in the response message frame based on the parameter information included in the first message frame. The sending module 520 may be configured to send the response message frame. The response message frame may be similar to the format described with reference to step 330, and the repeated description is omitted for conciseness.

Configurations of the communication apparatus 400 of FIG. 4 and the communication apparatus 500 of FIG. 5 are only illustrative, and the embodiments of the disclosure are not limited thereto. For example, the communication apparatus 400 of FIG. 4 and the communication apparatus 500 of FIG. 5 may include more or fewer modules.

The communication apparatuses provided according to the embodiments of the disclosure can enable the QoS data frames provided with the same TID to be transmitted and the receiving status is signaled, on the multiple links, thus improving the network throughput.

In addition, the above-mentioned "module" can be implemented by a combination of software and/or hardware, and this is not particularly limited in embodiments of the disclosure.

Figure 6:
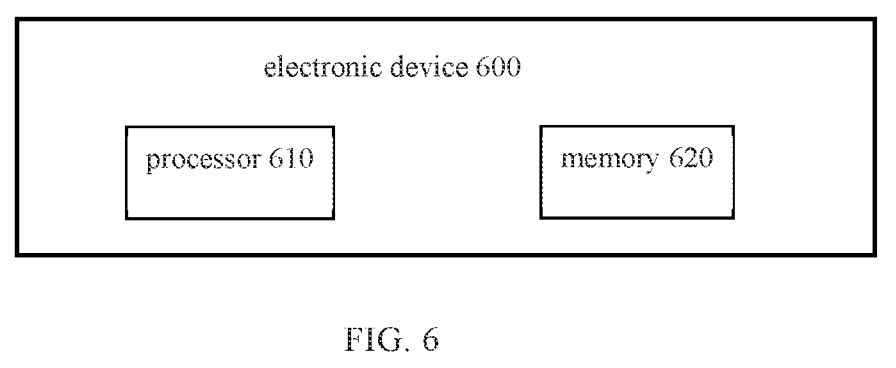

Based on the same principle as the method provided by the embodiments of the disclosure, embodiments of the disclosure also provide an electronic device. FIG. 6 is a schematic diagram showing an electronic device 600 on multiple links according to some embodiments of the disclosure. The device 600 includes a processor 610 and a memory 620. Machine-readable instructions (which also can be referred to as "computer programs") are stored in the memory 620. The processor 610 is configured to execute the machine-readable instructions to perform the method described with reference to FIGS. 2 and 3.

Embodiments of the disclosure also provide a computer-readable storage medium having stored therein computer programs that, when executed by a processor, cause the method described with reference to FIGS. 2 and 3 to be performed.

In some embodiments, the processor may be a logic block, a module, and a circuit for implementing or executing various examples described in connection with the disclosure, such as a central processing unit (CPU), a generic processor, a digital signal processor (DSP), an application specific integrated circuit (ASIC), a field programmable gate array (FPGA) or other programmable logic device, transistor logic devices, hardware components, or any combination thereof. The processor can also be a combination that implements computing functions, such as a combination of one or more microprocessors, or a combination of the DSP and the microprocessor.

In some embodiments, the memory may be, for example, a read only memory (ROM), a random access memory (RAM), an electrically erasable programmable read only memory (EEPROM), a compact disc read only memory (CD-ROM) or other optical disc storage, an optical disk storage (including compact disk, laser disk, optical disk, digital versatile disk, Blu-ray disk, etc.), a magnetic disc storage medium or other magnetic storage device, or any other medium that can be used to carry or store program codes in the form of instructions or data structures and can be accessed by a computer, but is not limited to this.

It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequence. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of sub-steps or stages of the other steps.

Although the disclosure has been shown and described with reference to certain embodiments thereof, it will be understood by those skilled in the art that various changes in form and details can be made without departing from the scope of the disclosure. Therefore, the scope of the disclosure should not be limited to the embodiments, but should be defined by the appended claims and their equivalents.

The invention claimed is:

1. A method for communication on multi-links, comprising:

determining a first message frame, wherein the first message frame is an add block Ack (ADDBA) request frame; and sending the first message frame, wherein the first message frame comprises parameter information of the communication on the multi-links, and the parameter information is defined in a Block Ack Parameter Set field in the ADDBA request frame;

wherein the parameter information comprises at least one buffer size parameter and at least one link set identifier, and a link set corresponding to the link set identifier has at least one link to be used for data transmission among the multi-links;

wherein a number of buffer size parameters is equal to a number of links among the multi-links used to transmit data with a first communication identifier TID.

2. The method of claim 1, wherein the parameter information further comprises at least one traffic identifier, wherein the traffic identifier corresponds to the link set identifier.

3. The method of claim 1, wherein the first message frame further comprises a type identifier configured to indicate a type of the first message frame on the multi-links.

4. The method of claim 1, wherein the first message frame further comprises time information on the multi-links.

5. The method of claim 1, further comprising:

receiving a response message frame of the first message frame, wherein the response message frame comprises information corresponding to the parameter information.

6. A non-transitory computer-readable storage medium having stored therein computer programs that, when executed by a processor, cause the processor to perform the method of claim 1.

7. A method for communication on multi-links, comprising:

receiving a first message frame, wherein the first message frame comprises parameter information of the communication on the multi-links, the first message frame is an add block Ack (ADDBA) request frame, and the parameter information is defined in a Block Ack Parameter Set field in the ADDBA request frame; and determining a response message frame based on the first message frame;

wherein the parameter information comprises at least one buffer size parameter and at least one link set identifier, and a link set corresponding to the link set identifier has at least one link to be used for data transmission among the multi-links;

wherein a number of buffer size parameters is equal to a number of links among the multi-links used to transmit data with a first communication identifier TID.

8. The method of claim 7, wherein the parameter information further comprises at least one traffic identifier, wherein the traffic identifier corresponds to the link set identifier.

9. The method of claim 7, wherein determining the response message frame comprises:

determining parameter information in the response message frame based on the parameter information comprised in the first message frame.

10. The method of claim 7, wherein the response message frame comprises a type identifier configured to indicate a type of the response message frame on the multi-links.

11. An electronic device, comprising:

a processor; and a memory storing a computer program executable by the processor, wherein the processor is configured to perform the method of claim 7.

12. A non-transitory computer-readable storage medium having stored therein computer programs that, when executed by a processor, cause the processor to perform the method of claim 7.

13. An electronic device, comprising:

a processor; and a memory storing a computer program executable by the processor, wherein the processor is configured to:

determine a first message frame, wherein the first message frame is an add block Ack (ADDBA) request frame; and send the first message frame, wherein the first message frame comprises parameter information of communication on multi-links, and the parameter information is defined in a Block Ack Parameter Set field in the ADDBA request frame;

wherein the parameter information comprises at least one buffer size parameter and at least one link set identifier, and a link set corresponding to the link set identifier has at least one link to be used for data transmission among the multi-links;

wherein a number of buffer size parameters is equal to a number of links among the multi-links used to transmit data with a first communication identifier TID.

* * * * *